Aug. 31, 1926.
R. D. STEVENSON
RETENTION DEVICE
Filed April 8, 1920
1,598,165
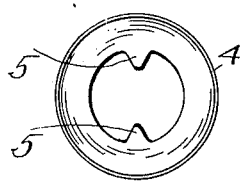
Fig. 1.
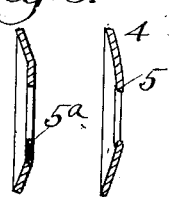
Fig. 3.
Fig. 2.
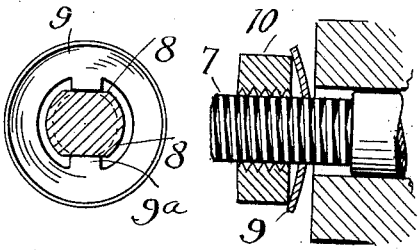
Fig. 4.
Fig. 5.
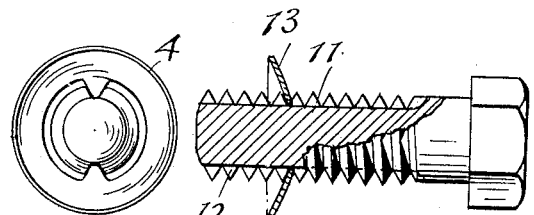
Fig. 6a.
Fig. 6.
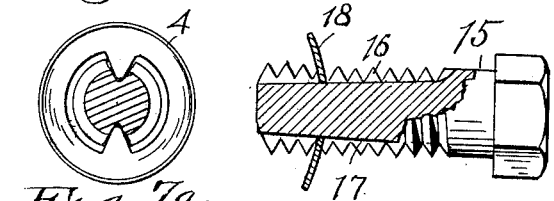
Fig. 7a.
Fig. 7.
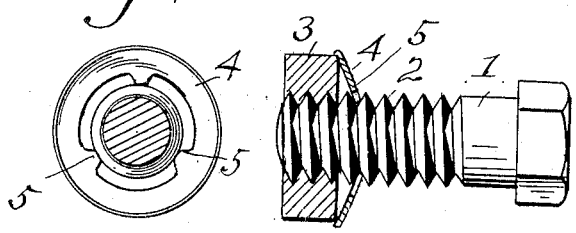
Fig. 8a.
Fig. 8.
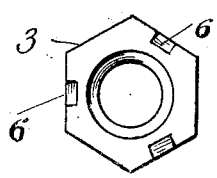
Fig. 9.
Inventor
Ralph D. Stevenson
by
Thurston Kwis & Hudson
attys.

Patented Aug. 31, 1926.

1,598,165

UNITED STATES PATENT OFFICE.

RALPH D. STEVENSON, OF CLEVELAND, OHIO.

RETENTION DEVICE.

Application filed April 8, 1920. Serial No. 372,122.

The present invention relates to a retention construction in which a threaded element, which is to effect retention, may be moved to the place where its retention action is completely effected and at this point the threaded element is locked in position.

Perhaps the most common construction which the present invention may assume is exemplified in a nut and bolt, and this construction is employed in the drawings and specification for the purpose of describing the invention.

Reference should be had to the accompanying drawings forming a part of this specification in which Fig. 1 is an end elevation of a cup washer; Fig. 2 is a sectional elevation of a cup washer; Fig. 3 is a sectional elevation of a cup washer; Fig. 4 is a sectional elevation of one form of the invention as applied to a nut and bolt construction; Fig. 5 is a sectional elevation of a nut and bolt construction embodying the invention; Fig. 6 is an elevation with parts in section embodying a modified form of the invention; Fig. 6ª is an end elevation of Fig. 6; Fig. 7 is an elevation with portions in section embodying a modified form of the invention; Fig. 7ª is an end elevation with portions in section of Fig. 7; Fig. 8 is an elevation with parts in section of a modified form of the invention; Fig. 8ª is an end elevation with portions in section of Fig. 8; and Fig. 9 is an elevation of a nut.

Perhaps the simplest form of the invention, although not necessarily the most effective form, is shown in Fig. 8 in which there is exemplified a bolt 1 having a threaded portion 2. This bolt is adapted to cooperate with a threaded nut, such as indicated at 3. The construction which so far has been described is the usual nut and bolt construction.

Upon the threaded portion of the bolt 1 is a washer 4. This washer is saucer shaped or cupped in its general configuration and is provided with a central opening, which in its general diameter is slightly greater than the thread diameter of the bolt. Formed integral with the body of the washer are inwardly extending lugs, such as indicated at 5. There may be two or more of such lugs, but whatever the number of lugs employed, they should be symmetrically placed with respect to each other, so as to provide an even or uniform bearing for the washer when inserted on a threaded element.

In applying such a washer to the bolt 1, the distance between the ends of the lugs should be such as to just pass over the threads 2. That is to say, the relation should be such that the washer may be pushed over the threads, but there should be no loose play.

When such a construction as has been described is used in a bolt-up, the bolt is inserted through a suitable opening formed through the parts which are to be bolted together. Over the projecting thread end of the bolt, the washer 4 is introduced, and then the nut 3 is threaded onto the bolt. As the nut advances along the threads 2 it pushes the washer 4 ahead of it until the washer abuts against the elements which are to be bolted together and continued turning of the nut will push the washer against the elements being held and distort it into a substantially flat position.

Under this action the lugs 5 of the washer move inwardly and seat themselves in the threads of the bolt, and to a certain extent take into the metal, so that the washer is rigidly held against turning with respect to the bolt 2. After this the edge of the washer 2 is bent by use of a cape chisel or other suitable tool, so that a portion of the washer is bent into engagement with one or more of the chucks or recesses 6, formed in the nut 4. This operation locks the nut with respect to the washer and inasmuch as the washer is locked with respect to turning upon the bolt, it follows that the nut is locked upon the bolt and will not turn relative to the bolt.

The lugs 5 may in general conform to the curvature of the washer, as indicated in Fig. 2, or, if desired, the lugs, such as indicated at 5ª may be initially bent so as to lie in a common flat plane.

Another form, which the invention may assume, is indicated in Figs. 4 and 5, wherein the threaded end of a bolt 7 is provided with a plurality of flat surfaces, such as indicated at 8. These flat surfaces are arranged symmetrically with respect to each other.

In Fig. 4 a washer is shown as associated with such a bolt, this washer being indicated at 9, and provided with a plurality of symmetrically arranged inwardly extending lugs 9ᵃ, which are adapted to engage with the flat surfaces 8 upon the bolt 7. As will be noted, the washer 9 is provided with a central opening which is slightly larger in diameter than the thread diameter of the bolt, with which it is associated, and therefore it follows that when the washer 9 is pushed upon the bolt and the lugs co-operate with the surface 8, the washer is pushed so as to have an even bearing on the bolt and to space the washer from the threads of the bolt.

The washer 9 is cupped, as before described, and when the nut 10 is screwed upon the bolt 7 it pushes the washer against the surface of the element to be bolted, and flattens the washer, causing the lugs 9ᵃ to effectively grip the surface of the bolt with which they are in contact, and prevent any relative rotation between the washer and the bolt.

The nut 10 is provided with chucks or recesses, such as shown in the nut 3, and parts of the washer are bent into one or more of the chucks as previously described. This construction effectively locks the nut 10 to the bolt 7.

In Fig. 6 the bolt is provided with a plurality of grooves, such as indicated at 11 and 12. These grooves are symmetrically arranged with respect to the axis of the bolt. The grooves extend longitudinally of the bolt, substantially through the portion which is threaded, and moreover, in the construction being described, the grooves are of even depth throughout their length.

A washer 13, which is similar to the washers before described, is positioned upon the bolt such that the lugs will occupy the grooves 11 and 12. The action, in so far as the co-operation between the nut and the washer is concerned, is precisely the same as that which has been previously described.

In Fig. 7 there is shown a bolt 15, which has a plurality of grooves, which are symmetrically arranged, the drawings showing two grooves 16 and 17 which are oppositely disposed. These grooves extend longitudinally of the bolt throughout the threaded end, and are tapered from the threaded end toward the head of the bolt, the grooves being deepest at the threaded end of the bolt.

A washer 18 co-operates with the bolt, which washer may be of the form shown in either Fig. 2 or 3. In this construction, as the washer is pushed upon the bolt, when the nut is screwed upon the bolt, there is a constantly increasing frictional contact between the surface of the grooves in the bolt and the projections upon the washer so that when the washer is pushed into its ultimate position by the turning of the nut, the washer is in what may be described as tight frictional engagement with the bolt. This washer is flattened out by the screwing on of the nut, as previously described, and a portion of the washer is bent into one or more of the recesses or chucks formed in the nut.

As will be apparent from the foregoing description, the underlying principle of construction embodied in all the various forms which have been described, is that of a cupped washer which co-operates with the threaded bolt and is flattened out when the nut is threaded to its ultimate point of retention, which flattening process causes the washer to very tightly engage the bolt and effectively prevent any turning action between the bolt and the washer, so that subsequently when the washer is bent into one or more of the chucks in the nut, the nut then becomes locked to the bolt.

Having described my invention, I claim:

1. The combination of a threaded stem and a threaded member adapted to screw on the same, a cupped washer having a central opening and lugs extending inwardly into such opening upon said washer and being adapted to be mounted upon the threaded stem, the threaded stem being provided with longitudinally extending surfaces with which the lugs of the washer are adapted to co-operate.

2. The combination of a threaded stem and a threaded member adapted to screw on the stem, a cupped washer having a central opening of larger diameter than the thread diameter of the stem, said washer being provided with a plurality of lugs which extend into the central opening, the said stem being provided with a plurality of grooves extending longitudinally thereof with which the lugs on the said washer are adapted to co-operate.

3. The combination of a threaded stem and a threaded member adapted to screw on the stem, a cupped washer having a central opening of larger diameter than the thread diameter of the stem, said washer being provided with a plurality of lugs, which extend into the central opening, the said stem being provided with a plurality of tapered grooves extending longitudinally thereof with which the lugs on the said washer are adapted to co-operate.

In testimony whereof, I hereunto affix my signature.

RALPH D. STEVENSON.